United States Patent [19]

Hanazawa et al.

[11] Patent Number: 4,812,327
[45] Date of Patent: Mar. 14, 1989

[54] EMULSION-TYPE RUST PREVENTIVE BAKING COMPOSITION

[75] Inventors: Hideaki Hanazawa; Makoto Mori; Katsumi Sasaki; Katsumi Inagaki, all of Osaka, Japan

[73] Assignee: National Starch and Chemical Corporation, Bridgewater, N.J.

[21] Appl. No.: 104,141

[22] Filed: Oct. 2, 1987

Related U.S. Application Data

[62] Division of Ser. No. 19,845, Feb. 27, 1987.

[30] Foreign Application Priority Data

Mar. 11, 1986 [JP] Japan .................................. 61-053285

[51] Int. Cl.$^4$ ................................................. B05D 3/02
[52] U.S. Cl. .................................. 427/388.4; 427/375; 427/378; 524/60; 524/61; 524/501
[58] Field of Search ................. 427/388.4; 524/60, 61, 524/501

[56] References Cited

U.S. PATENT DOCUMENTS

| | | | |
|---|---|---|---|
| 3,003,893 | 10/1961 | Mertz | 427/388.4 |
| 3,361,617 | 1/1968 | Kaizerman . | |
| 3,432,339 | 3/1969 | Howell | 427/388.4 |
| 3,746,677 | 7/1973 | Arai . | |
| 3,925,576 | 12/1975 | Hendrix | 427/388.4 |
| 4,069,186 | 1/1978 | Ramig | 524/501 |
| 4,094,847 | 6/1978 | Huffman . | |
| 4,171,295 | 10/1979 | Frese et al. | 524/501 |
| 4,238,542 | 12/1980 | Burley . | |
| 4,354,001 | 10/1982 | Kuan . | |
| 4,359,546 | 11/1982 | Bershas . | |
| 4,431,689 | 2/1984 | Günter et al. | 427/388.4 |
| 4,456,726 | 6/1984 | Siol . | |
| 4,555,412 | 11/1985 | Günter et al. | 427/388.4 |
| 4,597,817 | 7/1986 | Larsen . | |
| 4,610,898 | 9/1986 | Engel et al. | 427/388.4 |
| 4,619,960 | 10/1986 | Dodge . | |

Primary Examiner—Joseph L. Schofer
Assistant Examiner—Peter D. Mulcahy
Attorney, Agent, or Firm—Royal N. Ronning, Jr.; Edwin M. Szala

[57] ABSTRACT

Emulsion type rust-preventive baking composition which comprises a polymer emulsion such as an aqueous acrylic resin emulsion and a heat-fusible organic filler having a melting or softening point within the range of 40°–250° C. which is higher by at least 10° C. than the lowest film-forming temperature of the polymer emulsion, as incorporated in the polymer emulsion. When the emulsion type rust-preventive baking composition obtained by the mixture is coated on reinforcing steel rods or the like treatment targets and baked, the heat-fusible organic filler melts and fills pores in the rust-preventive coat film, whereby the coat film is rendered close and compact to produce excellent rust-preventive effect.

16 Claims, No Drawings

EMULSION-TYPE RUST PREVENTIVE BAKING COMPOSITION

This application is a division of application Ser. No. 019,845, filed Feb. 27, 1987.

BACKGROUND OF THE INVENTION

1. Industrial Field of Utilization

This invention relates to an emulsion-type-rust-preventive baking composition which has good workability, can form a durable and surpassingly rust-preventive coat film on an article treated therewith and is particularly useful in the prevention of rusting of reinforcing steel rods for reinforced concrete.

2. Prior Art

Generally, steel rods for concrete reinforcement are used in two ways: they are assembled on the spot to give a concrete structure-reinforcing construction or used in factories as reinforcements for precast boards or autoclaved lightweight concrete products. In either moder of use, steel rods for concrete reinforcement encounter rusting-related problems. Thus, in the case of on-the-spot use, steel rods are exposed to the weather (wind, rain, sunlight) and get rusty until their embedment into concrete. When concrete placing is conducted with rusty steel rods, the steel rods fail to satisfactorily perform their proper reinforcing function. Recently, sea sand is used in large amounts as the sand for concrete, and salts contained in sea sand offer a problem; they cause corrosion of reinforcing steel rods, hence marked decrease in durability of concrete structures, even after concrete placing. Furthermore, concrete constructions built near the seashore are subject to corrosion of reinforcing steel rods as a result of permeation of salts. Such corrosion results in decrease in the strength of said concrete constructions and, in extreme cases, in disintegration of said constructions, in a short period of time.

On the other hand, in the case of use in factories, particularly in the case of use in autoclaved lightweight concrete products, reinforcing steel rods are yet very susceptible to rusting because the body concrete is not alkaline but kept neutralized and is porous and readily permeable to moist and air. Thus, rusting is a very serious problem to steel rods for concrete reinforcement. Development of effective means of rust prevention is earnestly desired.

In recent years, various techniques of preventing steel rods for concrete reinforcement from rusting have been proposed. They are classifiable roughly into four categories, namely (1) the technique comprising applying to reinforcing steel rods a cement-type rust-preventive composition which is a mixture of a synthetic resin or the like and cement or the like, (2) the technique comprising applying to reinforcing steel rods an organic solvent-based paint to thereby form a close and compact coat film on the surface of said rods, (3) the technique comprising forming a rust-preventive coat film on the steel rod surface using a water-based rust-preventive paint composed of a rubber latex, a silica powder, lime, etc. and (4) the technique comprising baking an epoxy resin powder on the steel rod surface. According to a typical example of the above technique (1), as described in Japanese Patent Publications Nos. 2843/1956, 23879/1961 and 15062/1970, methylcellulose or a latex is added to portland cement and the mixture is applied to reinforcing steel rods or, according to another example of technique (1), as described in Japanese Patent Publication No. 1698/1983, a cement-based rust-preventive composition is prepared from a synthetic resin emulsion and a rapid-curing cement and applied to such rods. However, these proposed category (1) techniques are not yet fully satisfactory in respect of reliability. The above-mentioned cement-based rust-preventive composition has a pot life and therefore is usable only within a limited period of time. The rust-preventive coat film is fragile and easily peels off during transportation of coated reinforcing steel rods, shrinkage of the coat film leads to crack or fissure formation, pinholes are producd on the coat film and, due to these phenomena, the rust-inhibiting power is apt to decrease, hence lacks reliability. Furthermore, when cement is neutralized, the rust-inhibiting power lowers to an extreme extent. According to a typical example of the above-mentioned category (2) technique, as described in Japanese Patent Publication No. 1581/1975, a close and compact coat film is formed by applying a polystyrene resin solution type paint to the reinforcing steel rod surface. This technique indeed produces excellent rust-preventive effect but can hardly be put into practical use because the solvent used there may possibly cause working environment impairment, fire, air pollution and/or environmental disruption, among others. According to a typical example of the above-mentioned category (3) technique, as described in Japanese Patent Publication No. 97617/1975, a water-based rust-preventive paint is prepared by admixing a silica powder, lime and so forth with a rubber latex and this paint is used for rust-preventive coat film formation. This technique is disadvantageous, however, since the rust-preventive coat film is inferior in closeness and compactness to that derived from the above-mentioned organic solvent-based paint, hence the rust-inhibiting power cannot reach a practical level. According to a typical example of the above-mentioned category (4) technique, an epoxy resin powder is applied to reinforcing steel rods by baking. This technique gives a very firm and strong rust-preventive coat film and therefore is the most reliable one among the known rust-preventive treatment techniques. However, this technique is disadvantageous because of expensiveness and insufficient adhesion of the coat film to body concrete.

Problems Which the Invention is to Solve

Such various proposed techniques of preventing rusting of steel rods for concrete reinforcement each has its disadvantages and the present actual situation is that no satisfactory technique of rust prevention is available as yet.

Accordingly, an object of the present invention, which has been made under these circumstances, is to provide an aqueous emulsion-type rust-preventive composition capable of forming an excellent and durable rust-preventive coat film on treatment targets, such as reinforcing steel rods, by making good use of such advantageous features of aqueous emulsion type rust-preventive compositions as good durability, storage stability (long pot life) and economy and improving such compositions in respect of insufficient closeness or compactness of rust-preventive coat films and in respect of adherence of coat films to treatment targets.

Means of Solving the Problems

In accordance with the present invention and to achieve the above object, at least the component (A) out of the components (A) and (B) specified below is incorporated in an aqueous polymer emulsion capable of forming coat films:

(A): A heat-fusible organic filler having a melting or softening point within the range of 40°–250° C. which is higher by a least 10° C. than the lowest film-forming temperature of said emulsion;

(B): A bitumen emulsion.

The above emulsion-type rust-preventive baking composition is thus essentially an aqueous emulsion-based rust-preventive composition and, like the conventional aqueous emulsion-based rust-preventive compositions, it gives rust-preventive coat films when subjected to a series of treatment steps, namely steps of application, predrying for film formation and drying proper. However, the emulsion-type rust-preventive baking composition according to the invention differs from the conventional compositions of this type in that it contains at least the above component (A), so that a heat-fusible organic filler (component "A") is distributed throughout the aqueous polymer emulsion coat film formed during the above-mentioned predrying step for coat film formation. Upon heating in the subsequent main drying step, the heat-fusible organic filler melts and becomes fluid and fills pores or voids in the aqueous polymer emulsion coat film, whereby the coat film is rendered close and compact. As a result, a rust-preventive coat film which is scarcely permeable to water and air and highly durable and thus comparable or even superior in physical characteristics to the organic solvent-based coat films is formed and this coat film produces excellent rust-preventive effect on reinforcing steel rods and other treatment targets.

In that instance, the above-mentioned heat-fusible organic filler not only fills pores and voids in the aqueous polymer emulsion coat film but also enters upon melting between the emulsion coat film and the steel rods or the like treatment targets to thereby improve the adherence therebetween. In particular, when steel rods for concrete reinforcement are coated with the emulsion-type rust-preventive baking composition according to the invention and thus provided with an aqueous polymer emulsion coat film (containing a heat-fusible organic filler) as formed after the step of predrying for film formation are used in manufacturing autoclaved light-weight concrete (hereinafter abbreviated as "ALC"), the heat applied for the heat treatment in an autoclave of concrete with said steel rods embedded therein at 180° C. and 10 atmospheres for 10 hours, for instance, can be partly utilized as the heat for drying proper of the above-mentioned aqueous polymer emulsion coat film, so that close and compact rust-preventive coat films having sufficient strength can be formed on steel rods for concrete reinforcement without taking a particular step for drying proper. On that occasion, the heat-fusible organic filler in the above emulsion coat film melts upon heating during the above-mentioned autoclaving treatment and produces emulsion coat film-reinforcing effect and at the same time enters in the molten state between the rust-preventive coat film and the body concrete to thereby improve the adherence between the steel rods and the body concrete. In this way, the effect of steel rods as concrete reinforcements is markedly increased.

The emulsion-type rust-preventive baking composition according to the invention may contain bitumen emulsion (component B) in combination with the above-mentioned component A. When supplemented with said bitumen emulsion, the emulsion-type rust-preventive baking composition can be more adherent to reinforcing steel rods without heat treatment after concrete placing as compared with the composition free of a bitumen emulsion Thus, for example, in cases where steel rods preliminarily coated with the rust-preventive composition by baking are assembled on the spot, markedly increased adherence can be attained between the steel rods and the body concrete and at the same time much increased adherence can be obtained between the steel rods and the rust-preventive coat film without need of heating after concrete pouring and placement as in the examples of ALC manufacture. While the reason why a bitumen emulsion can produce the above-mentioned effect remains uncertain, it is presumable that the sticking property of the bitumen emulsion might contribute in some way or other.

The above-mentioned aqueous polymer emulsion capable of forming coat films is not limited to any particule species. Any aqueous polymer emulsion may be used if it can form coat films. Preferred examples are aqueous synthetic resin emulsions so far used in emulsion-based paint compositions, such as aqueous acrylic resin emulsions and aqueous vinyl acetate resin emulsions. Rubber latices can be used suitably as well. The above-mentioned aqueous polymer emulsion should preferably have a lowest film-forming temperature not higher than 50° C., more preferably not higher than 20° C. When an emulsion has a lowest film-forming temperature exceeding 50° C., higher temperatures are required for film formation and unrepairable blisters and/or large pores are possibly formed in the coat films produced during the film formation process step; advisably, such emulsion should not be used. It is particularly desirable to use an aqueous polymer emulsion capable of forming coat films which are hardly decomposable during a long period of contact with alkaline components in concrete since coat films derived from rust-preventive compositions for steel rods for concrete reinforcement are kept in contact with such alkaline components for a long period of time. Typical examples of the aqueous polymer emulsion which are suitable from the above viewpoints are: aqueous emulsions of acrylic copolymers such as methyl methacrylate-butyl acrylate [65/35 to 25/75 (mole ratio; hereinafter the same shall apply)] copolymers and methyl methacrylate-2-ethylhexyl acrylate (80/20 to 40/60) copolymers aqueous emulsions of styrene-acrylic copolymers such as styrene-butyl acrylate (65/35 to 25/75) copolymers and styrene-2-ethylhexyl acrylate (80/20 to 40/60) copolymers synthetic rubber latices such as styrene-butadiene rubber latex, acrylonitrile rubber latex, butyl rubber latex, chloroprene rubber latex, propylene rubber latex and methyl methacrylate-butadiene rubber latex natural rubber latices; ethylene-vinyl acetate (35/65 to 65/35) copolymer emulsions; aqueous emulsions of vinyl acetate-vinyl versatate (90/10 to 50/50) copolymers; and aqueous emulsions of vinyl chloride-vinylidene chloride copolymers.

While the aqueous polymer emulsions mentioned above as examples can produce excellent effects, aqueous emulsions containing polymers which are principally based on the molecular structure of any of the above-mentioned polymers and further contain a crosslinking group such as the carboxyl, glycidyl or methylol group are more preferable. As an example, there may be mentioned an aqueous polymer emulsion obtained by copolymerization using acrylic acid or the like comonomer capable of undergoing crosslinking reaction in an amount of not greater than about 10 mole percent. An aqueous emulsion of such cross linkable polymer, when used in combination with a heat-fusible, crosslinkable organic filler to be mentioned later herein, can give rust-preventive coat films much more improved in closeness or compactness and in adherence, whereby the rust-preventing effect can be further increased.

Typical examples of the aqueous crosslinkable polymer emulsion such as mentioned above are carboxyl-modified styrene-butadiene rubber latices, aqueous emulsions of carboxyl or glycidyl group-containing acrylic copolymers, and aqueous emulsions of carboxyl or glycidyl group-containing styrene-acrylic copolymers.

The heat-fusible organic filler ("component A") to be dispersed in the aqueous polymer emulsion such as mentioned above should have a melting or softening point which is higher by at least 10° C. than the lowest film-forming temperature of said aqueous polymer emulsion and lies within the temperature range of 40°–250° C. When the melting or softening point of the heat-fusible organic filler is lower than the lowest film-forming temperature of the aqueous polymer emulsion or differs therefrom by less than 10° C., the melting of the heat-fusible organic filler already proceeds before the polymer film formation is complete, so that close and compact coat films can hardly be obtained, hence the object of the invention cannot be achieved. When said melting or softening point is higher by 10° C. or more than the lowest film-forming temperature of the aqueous emulsion but its absolute value is lower than 40° C., not only troubles from the practical viewpoint are encountered, for example the rust-pre-ventive composition becomes very difficult to handle, but also the coat films formed on steel rods for concrete reinforcement, for instance, have insufficient heat resistance, so that the reinforcing effect of steel rods may possibly be reduced. On the other hand, when the melting or softening point is so high as to exceed 250° C., the physical characteristics of the aqueous polymer emulsion coat films may possibly be impaired due to high temperatures in the step of drying proper (baking). This is unfavorable from the practical viewpoint. Therefore, the heat-fusible organic filler is required to have a melting or softening point within the range mentioned above.

The heat-fusible organic filler to be used in accordance with the invention may be of any kind provided that the above requirements are met. It is preferable, however, to employ one having good compatibility with the polymer in the aqueous emulsion. Furthermore it is preferable to select and use the most suitable one depending on the intended purpose of the rust-preventive composition; for instance, when the rust-preventive composition is to be applied to steel rods for concrete reinforcement, it is preferable to use a heat-fusible organic filler having good alkali resistance in combination with a polymer as mentioned above which has the same characteristic. Suitable examples of such heat-fusible organic filler are synthetic resins such as polystyrene, acrylonitrile-styrene (0/100 to 60/40) copolymers, styrene-methyl methacrylate (0/100 to 100/0) copolymers, polypropylene, polyethylene, phenol resin precondensates and uncured epoxy resins, rosin, petroleum resins, and bituminous materials having a glass-like solid form at room temperature. These have good compatibility with such polymers in aqueous emulsions as given as examples suited for use in the practice of the invention and also have good alkali resistance and therefore can be used preferably in compounding the emulsion-type rust-preventive baking composition according to the invention. Among the materials given above as examples, the uncured-form crosslinkable resins, such as phenol resin precondensates and uncured epoxy resins, can themselves form firm and strong coat films to thereby improve the mechanical properties and compactness of rust-preventive coat films and, when used in combination with the above-mentioned crosslinkable polymer, can produce best effects as a result of curing by crosslinking integrally with the polymer, whereby the closeness and compactness of rust-preventive films and the adherence to treatment targets can be markedly improved.

The shape and size of the above-mentioned heat-fusible organic filler are not critical provided that said filler is dispersible in the above-mentioned aqueous polymer emulsion. Thus, it may be used in the form of a powder, granules, flakes or short fibers of any optional shape and size, without causing troubles. However, when it is too finely divided, sagging or the like may unfavorably occur on coat films in the step of applying the rust-preventive composition. Therefore, it is desirable to use the filler in a granular or short fiber form. The use of the filler in such form enables the resulting rust-preventive composition to have very good coating characteristics, which in turn enable providing treatment targets having a complicated shape or reinforcing steel rods varying in diameter with a coat film uniform in thickness by a single coating operation, with slight sagging even when the coat film thickness is fairly increased. As a result of this effect, among others, the rust-preventing power of the rust-preventive coat film is further increased. Accordingly, the use of the heat-fusible organic filler in a granular or short fiber form as mentioned above is particularly preferable. When said filler is in a granular form, it is desirable that the filler should wholly or partly have a grain size of not less than 10 $\mu$m, preferably not less than 40 $\mu$m and, considering the storage stability of the rust-preventive composition, the smoothness of the coating surface and other factors, the upper limit of the grain size should be placed at about 200 $\mu$m. When in a short fiber form, the filler should preferably have a fiber length of about 0.1–10 mm. The rust-preventive composition according to the invention may further contain an inorganic filler in addition to the above-mentioned heat-fusible organic filler. In that case, the inorganic filler should preferably have a granular form with a grain size of about 10–200 $\mu$m as in the above case of organic filler. When combinedly used, such inorganic filler itself can improve the precision of coating with the rust-preventive composition and, therefore, the heat-fusible organic filler to be used combinedly may be even in a powder form.

The level of addition of the above-mentioned heat-fusible organic filler may vary depending on the kind thereof. Generally, however, said filler is used preferably in an amount of 3–500 parts by weight (hereinafter, "parts" for short) per 10–500 parts of the polymer solids in the aqueous polymer emulsion. For obtaining close and compact coat films, said filler may be used in an amount of 10–500 parts when any bitumen emulsion is not used or in an amount of 3–500 parts, as mentioned above, when a bitumen emulsion is used. In either case, the range of 20–100 parts is particularly preferred. When the heat-fusible organic filler is incorporated in an amount exceeding 500 parts, no more increase in closeness or compactness and adherence of coat films can be attained but, in some instances, the mechanical properties of the coat films may be impaired. Therefore, the level of addition of the heat-fusible organic filler should preferably be within the range of 3–500 parts, as mentioned above.

While the addition level range to be generally employed for the heat-fusible organic filler is as mentioned above, it is desirable that, when a relatively coarse filler, such as a granular or fiber-like filler, is used as the whole or part of the heat-fusible organic filler in the hope of improved coating characteristics, said relatively coarse filler should be used in an amount of 10–400 parts, preferably 40–400 parts, per 100 parts of the polymer solids in the aqueous polymer emulsion. In that case, the heat-fusible organic filler alone may be used as the relatively coarse filler in an amount within the above range or the relatively coarse filler is used in combination with an inorganic filler in a total amount which lies within the above range. Furthermore, an inorganic filler alone may be used in an amount within the above range, as the case may be. In this case, however, the use of a heat-fusible organic filler is still essential; the heat-fusible organic filler should be used within the general addition level range mentioned above.

The emulsion-type rust-preventive baking composition according to the invention may further contain a bitumen emulsion (component "B") in addition to the heat-fusible organic filler (component "A"), as already mentioned hereinabove. As said bitumen emulsion, there may be mentioned conventional bitumen emulsions produced by emulsifying one or more of bituminous materils such as straight asphalt, semiblown asphalt, natural asphalt, cutback asphalt, coal tar, oil tar, tar pitch and petroleum pitch in an aqueous medium using an emulsifier, a stabilizer, a protective colloid, etc. The bituminous material to be used in said bitumen emulsion may be a bituminous material modified by addition of a polymer material such as a rubber.

The bitumen emulsion generally includes cationic, anionic and nonionic emulsions as classified according to the type of emulsifiers used therein. In the practice of the invention, an appropriate bitumen emulsion should preferably be selected from among them considering the stability upon admixture with the above-mentioned aqueous polymer emulsion, the heat-fusible organic filler and further with the inorganic filler and rust-preventive pigment to be mentioned later herein.

The above-mentioned bitumen emulsion is preferably used in an amount within the range of 5–100 parts, more preferably 7–30 parts, of the solids containined therein per 100 parts of the polymer solids in the aqueous polymer emulsion. In an amount of less than 5 parts, the bitumen emulsion cannot produce significant improvement in adherence between coat film and body concrete and between coat film and steel rods or in water resistance, hence marked improvement in rust preventing property cannot be expected. On the other hand, the use at an addition level exceeding 100 parts is also undersirable since further improvements in coat film adherence and water resistance cannot be observed any more as in the above case but rather the mechanical properties of the coat film are readily impaired in some instances.

The emulsion-type rust-preventive baking composition according to the invention may further contain an inorganic filler, a synthetic pigment and so forth each in an appropriate amount in addition to the above-mentioned heat-fusible organic filler (component "A") and the above-mentioned bitumen emulsion (component "B").

Typical examples of said inorganic filler are powders or granules of white marble, siliceous sand, talc, clay and anhydrous calcium carbonate, and further asbestos, etc. This inorganic filler produces various favorable effects, improving the coating characteristics of the rust-preventive composition, reinforcing the rust-preventive coat film to thereby prevent cracking with time, and further realizing improvement in adherence between rust-preventive coat film and body concrete. Such inorganic filler should desirably be used in an amount of 40–500 parts, preferably 80–400 parts, per 100 parts of the polymer solids in the aqueous polymer emulsion. In cases where a bitumen emulsion is incorporated in the rust-preventive composition, the inorganic filler may be used in an amount larger than that mentioned above, namely in an amount of 40–800 polymer solids in the aqueous polymer emulsion. For the purpose of improving the coating characteristics of the rust-preventive composition, the inorganic filler should desirably be used in a granular or short fiber form, particularly in a granular form with a grain size of about 10–200 $\mu$m in an amount such that the total amount of the inorganic filler plus the heat-fusible organic filler becomes equal to 10–400 parts, preferably 40–400 parts, per 100 parts of the polymer solids. When an inorganic filler is used and the total amount of the coarse grain fraction of said inorganic filler plus the coarse heat-fusible organic filler as mentioned above is within the range of 10–400 parts, preferably 40–400 parts, per 100 parts of the polymer solids, the remaining portion of the inorganic filler may be in a fine grain or powder form. For an inorganic filler to be able to fully produce its effect, it is rather desirable that the coarse grain fraction thereof should account for the above-mentioned amount, with the remaining portion being in a finer grain or powder form. The use of a mixture of siliceous sand with a grain size of 40–150 $\mu$m and one or more of talc powder, lay powder, anhydrous calcium carbonate powder and silica powder in a mixing ratio of 1:0.1 to 1:5 (by weight), for instance, is most preferred.

Any rust-preventive pigment usable in ordinary rust-preventive paints may be used as the rust-preventive pigment. Typical examples are zinc phosphate, aluminum phosphate, lead phosphate, zinc molybdate, barium metaborate and calcium hydroxide. These rust-preventive pigments may be used either singly or in combination and can improve the rust-preventing effect of the rust-preventive composition. The above-mentioned rust-preventive pigment is used desirably in an amount of 10–200 parts per 100 parts of the polymer solids in the aqueous polymer emulsion. In an amount of less than 10 parts, said pigment cannot be expected to produce satisfactory potentiating effect. Conversely, in an amount exceeding 200 parts, said pigment cannot produce any further rust inhibition-increasing effect but may rather disadvantageously decrease the storage stability of the rust-preventive composition.

The emulsion-type rust-preventive baking composition may still further contain, as necessary, pigment-dispersing agents, defoaming agents, thickening agents, colorants and other additives, each appropriately selected and incorporated therein in an appropriate amount, in addition to the above-mentioned materials. The selection of such additives in that case is made based on the targets of application of the rust-preventive composition and other factors taken as criteria. The emulsion-type rust-preventive baking composition according to the invention is manufactured using the above-mentioned materials and following the conventional procedure for manufacturing emulsion-type paints.

The rust-preventive treatment with the emulsion-type rust-preventive baking composition according to the invention is generally carried out in the following manner. Thus, treatment targets such as steel rods for concrete reinforcement are first coated with the above-mentioned emulsion-type rust-preventive baking composition by roller coating, immersion or some other appropriate means, followed by predrying for formation of films of the aqueous polymer emulsion, whereby polymer films (emulsion coat films) containing an organic filler or an organic filler plus a bitumen emulsion and optionally containing or binding an inorganic filler, a rust-preventive pigment, etc. are formed on the treatment targets. The above-mentioned predrying is carried out at a temperature at which the aqueous polymer emulsion can form films but at which the heat-fusible organic filler will not melt or soften, thus generally at 20°–100° C. If the above predrying is conducted at a temperature at which the heat-fusible organic filler will melt or soften, the heat-fusible organic filler will melt and become fluid prematurely before or during emulsion coat film formation, as already mentioned hereinabove, and thus fail to fill voids sufficiently and, as a result, the rust-preventive composition according to the invention will fail to produce its characteristic rust-preventing effect. If said predrying is performed within a temperature range within which the heat-fusible organic filler will not melt or soften but which exceeds 100° C., formation of uniform and compact rust-preventive coat films will become difficult due to formation of blisters and/or coarse pores in the emulsion coat films formed. Therefore, appropriate predrying conditions should be selected considering the above factors. After emulsion coat film formation by predrying in that manner, the emulsion coat films are converted to close and compact rust-preventive coat films by drying proper (baking). The drying proper is effected by heating at a temperature at which the heat-fusible organic filler melts or softens, generally within the range of 100°–200° C., for a period of 5–30 minutes or longer, whereby the heat-fusible organic filler melts and becomes fluid and fills pinholes or voids in the emulsion coat films. This effect and the so-called baking effect combinedly cause conversion of the emulsion coat films to very close and compact rust-preventive coat films. On that occasion, said heat-fusible organic filler comes also between the above-mentioned rust-preventive coat films and the treatment targets and between said coat films and the body concrete to contribute to improvement in adherence therebetween. The coexistence of a bitumen emulsion results in further increase in the above-mentioned adherence and furthermore in good adherence between reinforcing steel rods and the body concrete and improvement in water resistance, which are attainable on the spot, and thus results in production of excellent rust-preventing effect.

When either one or both of the polymer and the heat-fusible organic filler in the aqueous emulsion are curable by crosslinking, the process conditions are selected so that the crosslinking reaction can be completed in the above step of drying proper. When the rust-preventive composition according to the invention is used for the prevention of rusting of steel rods for use in manufacturing ALC sheets, the autoclaving treatment (generally conducted under conditions of about 180° C., about 10 atmospheres and about 10 hours) in the ALC sheet manufacturing process can itself serve as a means of baking in lieu of the above-mentioned drying proper, as mentioned previously, and therefore any step of drying proper is no more necessary. Thus the production process can be shortened.

Effects of the Invention

As mentioned hereinabove, the emulsion-type rust-preventive baking composition according to the invention has those advantages which are characteristic of aqueous emulsion-based rust-preventive paints, for example good workability, storage stability (pot life) and economy, and at the same time can provide treatment targets such as reinforcing steel rods with close and compact coat films comparable to those given by solvent-based rust-preventive compositions and having excellent adherence to said treatment targets. Thus it is an epoch-making rust-preventive composition and is very useful in the fields where the prevention of rusting of steel rods for concrete reinforcement is earnestly demanded.

The following working examples and comparative examples are further illustrative of the present invention.

EXAMPLES 1–12 AND COMPARATIVE EXAMPLES 1–3

A bisphenol A-based epoxy resin (R-304; product of Mitsui Petrochemical Epoxy) having a melting point of 100° C. is pulverized and classified by sieving. The minute grain fraction was further subjected to air separation. Thus were prepared four heat-fusible organic filler fractions having a grain size range of less than 10 μm, 10–43 μm, 43–104 μm and 104–140 μm, respectively. Rust-preventive compositions were then prepared by incorporating one of the above granular heat-fusible organic fillers, optionally together with siliceous sand (inorganic filler) 43–140 μm in grain size, in a carboxylated styrene-butadiene rubber latex (JSR (JSR 0596; product of Japan Synthetic Rubber; solids content 50% (by weight; hereinafter the same shall apply); lowest film-forming temperature 0° C.) according to the formulations given below in Table 1. In Comparative Example 1, no fillers were incorporated in the above-mentioned rubber latex. In Comparative Example 2, the inorganic filler alone was incorporated. In Comparative Example 3, portland cement was incorporated.

The rust-preventive compositions prepared in this manner were tested for their coating characteristics on treatment targets as well as their rust-preventive performance characteristics by the methods mentioned below. The results thus obtained are also shown in Table 1.

Coating characteristics: The viscosity of each rust-preventive composition was adjusted to about 800 cps (20° C.) by addition of water and the composition was then used for coating of steel rods having a diameter of 2 mm and steel rods having a diameter of 12 mm by immersion. After predrying at 60° C. for 5 minutes, drying proper (baking) was performed at 185° C. for 10 minutes. Thereafter, the coated rods were examined for coat film thickness at various sites and for appearance. In this way, the uniformity of coat films was checked.

Rust-preventing effect: Steel rods treated for rust prevention in the same manner as above were immersed in 5% aqueous sodium chloride solution at 50° C. for 7 days and then examined for the extent of rusting.

TABLE 1

(Parts by weight)

| | Example | | | | | | | |
|---|---|---|---|---|---|---|---|---|
| | 1 | 2 | 3 | 4 | 5 | 6 | 7 | 8 |
| Rubber latex (solids content 50%) | 100 | 100 | 100 | 100 | 100 | 100 | 100 | 100 |
| Thickening agent (2% aqueous solution) (1) | 10 | 10 | 10 | 10 | 10 | 10 | 10 | 10 |
| Epoxy resin | | | | | | | | |
| <10 μm | 50 | — | — | — | — | — | — | — |
| 10–43 μm | — | 50 | — | — | — | — | — | — |
| 43–104 μm | — | — | 50 | — | — | — | — | — |
| 104–140 μm | — | — | — | 50 | 3.5 | 5 | 20 | 150 |
| Siliceus sand (43–140 μm) | — | — | — | — | — | — | — | — |
| Portland cement | — | — | — | — | — | — | — | — |
| Coat film formation | | | | | | | | |
| Film thickness (μm) | 80–130 | 100–150 | 100–150 | 120–180 | 80–150 | 100–150 | 120–150 | 150–200 |
| Uniformity of coat film | Thin areas here and there | Good | Good | Good | Fair | Good | Good | Good |
| Rust prevention | Fair | Good | Good | Good | Fair | Good | Good | Good |

| | Example | | | | Comparative Example | | |
|---|---|---|---|---|---|---|---|
| | 9 | 10 | 11 | 12 | 1 | 2 | 3 |
| Rubber latex (solids content 50%) | 100 | 100 | 100 | 100 | 100 | 100 | 100 |
| Thickening agent (2% aqueous solution) (1) | 10 | 10 | 10 | 10 | 10 | 10 | 10 |
| Epoxy resin | | | | | | | |
| <10 μm | 45 | 30 | 45 | 30 | — | — | — |
| 10–43 μm | — | — | — | — | — | — | — |
| 43–104 μm | — | — | — | — | — | — | — |
| 104–140 μm | 5 | 20 | — | — | — | — | — |
| Siliceus sand (43–140 μm) | — | — | 5 | 20 | — | 50 | — |
| Portland cement | — | — | — | — | — | — | 100 |
| Coat film formation | | | | | | | |
| Film thickness (μm) | 120–180 | 120–180 | 120–180 | 120–180 | 20–150 | 120–180 | 200–400 |
| Uniformity of coat film | Good | Good | Good | Good | Locally thin areas | Good | Good |
| Rust prevention | Good | Good | Good | Good | Marked rusting | Marked rusting | Crack formation & rusting |

Note (1): Polycarboxylic acid type (Yodosol KA-10, aqueous solution; product of Kanebo NSC)

The results shown in Table 1 indicate that the rust-preventive compositions of Examples 1–12 all can give good rust-preventing effect, that the rust-preventive compositions of Comparative Examples 1 and 2 which are free of any heat-fusible organic filler have no satisfactory rust-preventing effect, allowing marked rusting of the steel rods due to the presence of pinholes in the coat film, and that the organic filler-free rust-preventive composition of Comparative Example 3 is also insufficient in rust prevention characteristics due to cracking with time. The data also indicate that, among the compositions according to the invention, those containing one or both of the heat-fusible organic filler and inorganic filler in a coarse grain form having a grain size of not less than 10 μm in an amount of not less than 10 parts per 100 parts of the polymer solids also have good coating characteristics.

When the composition of Example 10 and that of Example 12 were compared with respect to the physical properties (coat film strength, coat film surface hardness) of the coat films formed under the same conditions as used in the above coating characteristics test, that of Example 12 gave better results.

This indicates that the combined use of an inorganic filler is preferable.

EXAMPLES 13 AND 14 AND COMPARATIVE

EXAMPLE 4

A paraffin wax having a softening point of 47° C. (wax I), a paraffin wax having a softening point of 70° C. (wax II) and a microcrystalline wax having a softening point of 84° C. (wax III) were prepared. These waxes were treated in the following manner to give wax-based organic fillers. Thus, 1 part of a nonionic emulsifier was added to 100 parts of the wax, and the mixture was melted and mixed at 105° C. and then added dropwise to 300 parts of hot water (90°–95° C.), whereby the wax was dispersed in water in a minute grain form. After cooling, the microgranular wax was collected by filtration, washed with cold water and classified by sieving to give a wax-based filler having a grain size range of 74–140 μm. The three kinds of wax-based filler obtained in this manner were respectively incorporated, together with the inorganic filler and rust-preventive pigment specified in Table 2, in an aqueous acrylic copolymer emulsion (Yodosol MM62; product of Kanebo NSC; solids content 50%; lowest film-forming temperature 50° C.) according to the formulations given in Table 2, to give rust-preventive compositions. The heat-fusible organic filler used in Comparative Example 4 had a softening point of 47° C., which is lower than the lowest film-forming temperature (50° C.) of the aqueous emulsion, hence failed to meet the requirements relative to the organic filler to be used in the rust-preventive composition according to the invention.

The rust-preventive compositions thus obtained were tested for their coating characteristics and rust prevention characteristics by the methods mentioned below. The results obtained are also shown in Table 2.

Coating characteristics: The viscosity of the rust-preventive composition was adjusted to about 800 cps (20° C.) by addition of water and the composition was then used for coating reinforcing steel rods having a diameter of 2 mm or 12 mm and L-shaped steel profiles therewith by immersion. After predrying at 65° C. for 10 minutes, baking was performed at 120° C. for 10 minutes. The coat films thus obtained were checked for uniformity thereof in the same manner as in Example 1.

Rust-preventing effect: The above test specimens were subjected to salt spray testing according to JIS K 5400. After the lapse of 240 hours, the specimens were examined for rusting and blistering.

TABLE 2

| | (Parts by weight) | | |
|---|---|---|---|
| | Example 13 | Example 14 | Comparative Example 4 |
| Acrylic copolymer emulsion (solids content 50%) | 100 | 100 | 100 |
| Organic filler | | | |
| Wax I, granular | — | — | 20 |
| Wax II, granular | 20 | — | — |
| Wax III, granular | — | 20 | — |
| Inorganic filler | | | |
| Anhydrous calcium carbonate powder (1) | 20 | 20 | 20 |
| Mica (2) | 10 | 10 | 10 |
| Rust-preventive pigment | | | |
| Zinc molybdate (3) | 20 | 20 | 20 |
| Red iron oxide (4) | 10 | 10 | 10 |
| Total | 180 | 180 | 180 |
| Coat film formation | | | |
| Film thickness (μm) | 100–150 | 100–150 | 40–200 |
| Uniformity of coat film | Good | Good | Locally thin areas; sags or runs seen |
| Rust prevention | Good | Good | Locally rusting |

Note (1): Fine powder; product of Takehara Chemical Industry Co. (Hereinafter, the same shall apply.)
Note (2): Fine powder; product of Kojunsha
Note (3): Fine powder; product of Kikuchi Color Industry Co.
Note (4): Fine powder; product of Tone Sangyo Co. (Hereinafter, the same shall apply.)

As is evident from the results shown in Table 2, the composition of Comparative Example 4 which failed to meet the requirements in relation to the heat-fusible organic filler to be used in the rust-preventive composition according to the invention gave inferior results with respect to both coating and rust-preventive characteristics due to the fact that the organic filler melted and became fluid already in the step of predrying for coat film formation.

EXAMPLES 15 AND 16 AND COMPARATIVE EXAMPLE 5

Five parts of polyvinyl alcohol having a polymerization degree of 1,700 and a saponification degree of 88 mole percent was dissolved in 250 parts of water. A solution of 1 part of benzoyl peroxide in 100 parts of styrene was added to the solution. The mixture was heated to 80° C. with stirring and this temperature was maintained for 5 hours. After cooling, the reaction product was taken out, washed well with water, dried and then classified by sieving to give a granular polystyrene resin 45–104 μm in grain size. The resin had a melting point of 180° C. This granular polystyrene resin was used as the organic filler and incorporated in an aqueous styrene-acrylate ester copolymer emulsion (Yodosol GF-1; product of Kanebo NSC; solids content 50%; lowest film-forming temperature 0° C.), together with the materials shown in Table 3, in accordance with the formulations given in Table 3.

The thus-obtained rust-preventive compositions were tested for their coating characteristics and rust-preventing effect by the methods mentioned below. The results thus obtained are also shown in Table 3.

Coating characteristics: The viscosity of the rust-preventive composition was adjusted to about 800 cps (20° C.) by addition of water and the composition was then applied to reinforcing steel rods having a diameter of 2 mm or 9 mm and L-shaped steel profiles by brushing. After predrying at 80° C. for 10 minutes, baking was performed at 200° C. for 10 minutes. The specimens thus obtained were checked for coat film uniformity in the same manner as in Example 1.

Rust-preventing effect: Salt spray testing was carried out in accordance with JIS K 5400 as in Example 13.

TABLE 3

| | (Parts by weight) | | |
|---|---|---|---|
| | Example 15 | Example 16 | Comparative Example 5 |
| Styrene-acrylic ester copolymer emulsion (solids content 50%) | 100 | 100 | 100 |
| Organic filler Polystyrene resin, granular | 30 | 20 | — |
| Inorganic filler | | | |
| Siliceous sand (43–140 μm) | — | 10 | 30 |
| Talc (1) | 20 | 20 | 20 |
| Anhydrous calcium carbonate powder | 20 | 20 | 20 |
| Rust-preventive pigment | | | |
| Zinc phosphate (2) | 10 | 10 | 10 |
| Red ion oxide | 10 | 10 | 10 |
| Dispersing agent (solids content 25%) (3) | 1 | 1 | 1 |
| Hydroxyethylcellulose (4% aqueous solution) (4) | 15 | 15 | 15 |
| Water | 49 | 49 | 49 |
| Total | 255 | 255 | 255 |
| Coat film formation | | | |
| Film thickness (μm) | 150–200 | 150–200 | 150–200 |
| Uniformity of coat film | Good | Good | Good |
| Rust prevention | Good | Good | Spotty rusting |

Note (1): Fine powder; product of Nippon Talc Co. (Hereinafter, the same shall apply.)
Note (2): Fine powder; product of Sakai Chemical Industry Co.
Note (3): "Natrol 42"; product of National Starch and Chemical Corp. (Hereinafter, the same shall apply.)
Note (4): "Unicel QP 4400H"; product of Daicel Chemical Industries. (Hereinafter, the same shall apply.)

EXAMPLES 17 AND 18 AND COMPARATIVE EXAMPLES 6 AND 7

Sodium dodecylbenzenesulfonate (0.2 part) and 1 part of polyoxyethylene nonylphenyl ether were dissolved in 130 parts of water and the solution was heated to 80° C. with stirring. Then, a mixture of 95 parts of styrene and 5 parts of methacrylic acid and a mixture of 0.1 part of ammonium persulfate and 20 parts of water were added dropwise over 2 hours. Thereafter, the mixture was maintained at 80° C. for 2 hours and then cooled. The pH was adjusted to 9 by addition of aqueous ammonia. There was obtained a dispersion containing a microgranular styrene-methacrylic acid copolymer (carboxyl group-containing resin) having an average grain size of 0.4 μm (solids content 40%, viscosity 200 cps at 20° C.). Rust-preventive compositions were prepared by incorporating the thus-obtained dispersion containing the carboxyl group-containing resin (organic filler) in an aqueous carboxyl group-containing acrylic copolymer emulsion (acrylic copolymer emulsion A) (Yodosol 32A812; product of Kanebo NSC; solids content 50%; lowest film-forming temperature 15° C.) or a carboxyl group-free acrylic copolymer emulsion (acrylic copolymer emulsion B) (Yodosol AD22; product of Kanebo NSC; solids content 50%; lowest film-forming temperature 26° C.), together with the materials shown in Table 4, according to the formulations given in Table 4. In Comparative Examples 6 and 7, the above organic filler emulsion was not used.

The thus-obtained rust-preventive compositions were tested for their coating and rust-preventive characteristics by the methods mentioned below. The results obtained are also shown in Table 4.

Coating characteristics: The viscosity of the rust-preventive composition was adjusted to about 800 cps (20° C.) and the composition was then applied to reinforcing steel rods having a diameter of 2 mm or 9 mm and L-shaped steel profiles by immersion. After predrying at 80° C. for 10 minutes, baking was carried out at 190° C. for 30 minutes. The specimens thus obtained were checked for coat film uniformity in the same manner as in Example 1.

Rust-preventing effect: Salt spray testing was made according to JIS K 5400 as in Example 13.

TABLE 4

| | (Parts by weight) | | | |
|---|---|---|---|---|
| | Example 17 | Comparative Example 6 | Example 18 | Comparative Example 7 |
| Acrylic copolymer emulsion A (solids content 50%) | 100 | 100 | — | — |
| Acrylic copolymer emulsion B (solids content 50%) | — | — | 100 | 100 |
| Organic filler dispersion (solids content 40%) | 50 | — | 50 | — |
| Inorganic filler | | | | |
| Siliceous sand (43-104 μm) | 20 | 40 | 20 | 40 |
| Anhydrous calcium carbonate powder | 30 | 30 | 30 | 30 |
| Rust-preventive pigment | | | | |
| Barium metaborate (1) | 20 | 20 | 20 | 20 |
| Calcium hydroxide (2) | 30 | 30 | 30 | 30 |
| Dispersing agent (solids content 25%) | 1 | 1 | 1 | 1 |
| Hydroxyethylcellulose (4% aqueous solution) | 20 | 20 | 20 | 20 |
| Water | 69 | 69 | 69 | 69 |
| Total | 340 | 310 | 340 | 310 |
| Coat film formation | | | | |
| Film thickness (μm) | 200-250 | 200-250 | 200-250 | 200-250 |
| Uniformity of coat film | Good | Good | Good | Good |
| Rust prevention | Good | Spotty rusting | Good | Spotty rusting |

Note (1): Fine powder; product of Sakai Chemical Industry Co.
Note (2): Fine powder; product of Kashino Lime Industry Co.

As is evident from Table 4, the compositions according to the invention are superior in both coating characteristics and rust-preventing effect to the compositions of Comparative Examples 6 and 7 which are unsatisfactory in respect of rust-preventive characteristics.

Coat films were formed by using the rust-preventive compositions of Examples 17 and 18 and the same film formation and baking conditions as used in the above test for coating characteristics. The coat films obtained were tested for physical properties (strength, elongation, surface hardness). The coat films obtained by using the composition of Example 17 gave better results than those obtained by using the composition of Example 18. This indicates that the crosslinkable type gives more favorable results.

EXAMPLE 19 AND COMPARATIVE EXAMPLE 8

Rust-preventive compositions (Example 19 and Comparative Example 8) were prepared in the same manner as in Example 17 and Comparative Example 6, respectively, except that a styrene-butadiene rubber latex (JSR 0591; product of Japan Synthetic Rubber; solids content 50%, lowest film-forming temperature 0° C.) was used in lieu of the acrylic copolymer emulsion A.

The thus-obtained rust-preventive compositions of Example 19 and Comparative Example 8 were tested for coating and rust-preventive characteristics in the same manner as in Example 17 and Comparative Example 6. As for the coating characteristics, both the compositions gave good results and differed little therebetween. As for the rust-preventing effect, however, while no rusting was observed at all in Example 19 even after the lapse of 240 hours, blistering was locally observed on the coat films and spotty rusting was detected in Comparative Example 6.

EXAMPLE 20

An uncured phenol resin in a bead form having an average grain size of 20 μm (Bellpearl S830; product of Kanebo) was used as the organic filler. This was incorporated in an aqueous methylol group-containing vinyl acetate-acrylic copolymer emulsion (125-2833; product of National Starch and Chemical; solids content 50%; lowest film-forming temperature 0° C.), together with other materials shown in Table 5, according to the formulations given in said table.

The rust-preventive compositions thus obtained were tested for coating characteristics (the viscosity being adjusted to about 600 cps and baking being conducted at 180° C. for 20 minutes) and rust-preventing effect in the same manner as in Examples 15 and 16 and Comparative Example 5. The results obtained are also shown in Table 5.

TABLE 5

| | Example 20 |
|---|---|
| Methylol grou-containing vinyl acetate-acrylate copolymer emulsion (solids content 50%) | 100 parts |
| Organic filler | 20 |
| Phenol resin beads | |
| Inorganic filler | 40 |
| Talc | |
| Anhydrous calcium carbonate powder | 20 |
| Rust-preventive pigment | |
| LF Bousei MC400MF (1) | 10 |
| Red iron oxide | 10 |
| Dispersing agent (solids content 25%) | 2 |
| Hydroxyethylcellulose (4% aqueous solution) | 20 |
| Water | 92 |
| Total | 314 |
| Coat film formation | |
| Film thickness (μm) | 70-120 |
| Uniformity of coat film | Good |
| Rust prevention | Good |

Note (1): Calcium molybdate-based one; product of Kikuchi Color Industry Co.

EXAMPLE 21

A $C_9$ petroleum resin (Arkon P-90; product of Arakawa Chemical) having a softening point of 90° C. was comminuted and classified by sieving. A granular fraction within the grain size range of 43-104 μm was collected and used as the organic filler. Thus, this was incorporated, together with other materials given in Table 6, in an aqueous styrene-acrylate ester copolymer emulsion (Yodosol GF-1) according to the formulations given in Table 6.

The thus-obtained rust-preventive compositions were tested for coating and rust-preventive characteristics by the methods mentioned below. The results of testing are also shown in Table 6.

Coating characteristics: The viscosity of the rust-preventive composition was adjusted to about 800 cps (20° C.) by addition of water and the composition was then applied to L-shaped steel profiles and H-shaped steel profiles by roller coating. After predrying at 50° C. for 10 minutes, baking was conducted at 130° C. for 30 minutes and the coat films obtained were checked for uniformity in the same manner as in Example 1.

Rust-preventing effect: Like in Example 13, salt spray testing was performed according to JIS K 5400.

TABLE 6

| | Example 21 |
|---|---|
| Styrene-acrylate ester copolymer emulsion (solids content 50%) | 100 parts |
| Organic filler | 40 |
| $C_9$ petroleum resin, granular | |
| Inorganic filler | |
| Siliceous sand (43-104 μm) | 70 |
| Talc | 50 |
| Rust-preventive pigment | 50 |
| Aluminum tripolyphosphate (1) | |
| Dispersing agent (solids content 25%) | 4 |
| Hydroxyethylcellulose (4% aqueous solution) | 30 |
| Water | 56 |
| Total | 400 |
| Coat film formation | |
| Film thickness (μm) | 220-280 |
| Uniformity of coat film | Good |
| Rust prevention | Good |

Note (1).: Fine powder; product of Teikoku Kako Co. (Hereinafter, the same shall apply.)

The data shown in Table 6 indicate that the rust-preventive composition of Example 21 can form thick rust-preventive coat films and is superior in both coating and rust-preventive characteristics.

EXAMPLES 22-28 AND COMPARATIVE EXAMPLE 9

Five parts of polyvinyl alcohol having a polymerization degree of 1,700 and a saponification degree of 88 mole percent was dissolved in 250 parts of water. To the solution was added 100 parts of styrene with 1 part of benzoyl peroxide dissolved therein. The mixture was heated to 80° C. with stirring and this temperature was maintained for 5 hours. After cooling, the reaction product was taken out, washed well with water, then dried, and classified by sieving to give a granular polystyrene resin 43-74 μm in grain size. This resin had a melting or softening point of 180° C. This granular polystyrene resin was used as the organic filler and incorporated, together with an asphalt emulsion (Assol H; product of Nichireki Chemical Industry; solids content 65%) and other materials, in an aqueous acrylic copolymer emulsion (Yodosol AD82; product of Kanebo NSC; solids content 45%; lowest film-forming temperature 0° C.) according to the formulations given in Table 7 to give rust-preventive compositions (Examples 22-27). For comparison, a rust-preventive composition (Example 28) containing no asphalt emulsion and an ordinary rust-preventive composition (Comparative Example 9) containing neither the organic filler nor the asphalt emulsion were prepared in parallel.

The rust-preventive compositions thus obtained were tested for coating characteristics, rust-preventing effect and adherence to cement mortar by the methods mentioned below. The results of the tests are also shown in Table 7.

Coating characteristics: The viscosity of each rust-preventive composition was adjusted to about 800 cps (20° C.) by addition of water and the composition was then applied to reinforcing steel rods having a diameter of 2 mm or 12 mm and L-shaped steel profiles by immersion. After predrying at 70° C. for 10 minutes, drying proper (baking) was carried out at 200° C. for 20 minutes. The coat films obtained were examined for thickness at various sites and for appearance, and the coat film uniformity was evaluated.

Rust-preventing effect: The test specimens prepared in the above coating characteristics testing were subjected to salt spray testing according to JIS K 5400 and, after the lapse of 240 hours, examined for rusting and blistering.

Adherence to cement mortar: Each test specimen prepared in the above coating characteristics testing was placed vertically in a standard sand mortar prepared by admixing and kneading 100 parts of portland cement, 200 parts of standard Toyoura sand and 65 parts of water. After 28 days of wet air curing at 20° C., the mortar was disintegrated and the adherence of the test specimen to the mortar was evaluated.

forcing ALC, exhibited practically sufficient and satisfactory coat film-body concrete adherence.

EXAMPLES 29–33

A bisphenol A-based epoxy resin (R-304; product of Mitsui Petrochemical Epoxy) having a melting point of 100° C. was comminuted and classified by sieving. A fraction from 43 to 104 μm in grain size was collected and used as the heat-fusible organic filler. Separately, a coal tar emulsion (solids content 60%) was prepared by adding a molten mixture of 80 parts of coal tar (purified

TABLE 7

| (Parts by weight) | | | | | | | | |
|---|---|---|---|---|---|---|---|---|
| | Example | | | | | | | Comparative Example |
| | 22 | 23 | 24 | 25 | 26 | 27 | 28 | 9 |
| Acrylic copolymer emulsion (solids content 45%) | 100 | 100 | 100 | 100 | 100 | 100 | 100 | 100 |
| Aspalt emulsion composition (solids content 65%) | 2 | 3.5 | 7 | 15 | 65 | 90 | — | — |
| Heat-fusible organic filler | 15 | 15 | 15 | 15 | 15 | 15 | 15 | — |
| Inorganic filler | | | | | | | | |
| Siliceous sand (40–140 μm) | 20 | 20 | 20 | 20 | 20 | 20 | 20 | 20 |
| Talc | 20 | 20 | 20 | 20 | 20 | 20 | 20 | 20 |
| Anhydrous calcium carbonate powder | 20 | 20 | 20 | 20 | 20 | 20 | 20 | 20 |
| Rust-inhibitor | | | | | | | | |
| Zinc phosphate | 10 | 10 | 10 | 10 | 10 | 10 | 10 | 10 |
| Red iron oxide | 10 | 10 | 10 | 10 | 10 | 10 | 10 | 10 |
| Dispersing agent (solids content 25%) | 1 | 1 | 1 | 1 | 1 | 1 | 1 | 1 |
| Hydroxyethylcellulose (4% aqueous solution) | 15 | 15 | 15 | 15 | 15 | 15 | 15 | 15 |
| Water | 22 | 23.5 | 24 | 24 | 29 | 29 | 24 | 14 |
| Total | 235 | 238 | 242 | 250 | 305 | 330 | 235 | 210 |
| Coat film formation | | | | | | | | |
| Film thickness (μm) | 150–200 | 150–200 | 150–200 | 150–200 | 150–200 | 150–200 | 150–200 | 100–200 |
| Uniformity of coat film | Good | Good | Good | Good | Good | Good | Good | Slightly thin areas |
| Rust prevention | Good | Good | Good | Good | Good | Good | Good | Marked rusting |
| Adherence to cement mortar | Fair | Good | Good | Good | Good | Good | Locally peeling at coat film/interface | Bad |

As is evident from the results shown in Table 7, the asphalt emulsion-free rust-preventive composition of Example 28 was indeed superior in coating and rust-preventive characteristics and in adherence to cement mortar to the rust-preventive composition of Comparative Example 9 which is free of either the organic filler or the asphalt emulsion, thus exhibits excellent characteristics as a rust-preventive composition, but has room for improvement with respect to adherence to cement mortar. On the contrary, the rust-preventive compositions with the asphalt emulsion incorporated therein (Examples 22–27) exhibit good adherence to cement mortar. The adherence-improving effect producible by the incorporation of the asphalt emulsion is particularly remarkable when said asphalt emulsion is added in an amount within the range of 5–100 parts (as solids) per 100 parts of the polymer.

The rust-preventive composition of Example 28, when used for preventing rusting of steel rods for reintar No. 1 according to JIS K 2439) and 20 parts of coal tar pitch (pitch for general use according to JIS K 2439) as heated at 60° C. dropwise to a warm water (60° C.) with 3 parts of polyoxyethylene nonylphenyl ether and 0.5 part of polyvinyl alcohol dissolved therein, with stirring.

The above organic filler and coal tar emulsion were incorporated in an aqueous carboxylated styrene-acrylate ester copolymer emulsion (Yodosol GF-1; product of Kanebo NSC; solids content 50%; lowest film-forming temperature 0° C.), together with other materials, according to the formulations given in Table 8 to give rust-preventive compositions (Examples 29 and 30).

For comparison, rust-preventive compositions free of the coal tar emulsion were also prepared (Examples 31 and 32).

The thus-obtained rust-preventive compositions were tested for coating and rust-preventive characteristics and for adherence to cement mortar in the same manner as in Examples 22–27. The results of the tests are also shown in Table 8.

TABLE 8

| | (Parts by weight) | | | |
| --- | --- | --- | --- | --- |
| | Example | | | |
| | 29 | 30 | 31 | 32 |
| Carboxylated styrene-acrylate ester copolymer emulsion (solids content 50%) | 100 | 100 | 100 | 100 |
| Coal tar emulsion composition (solids content 60%) | 60 | 60 | — | — |
| Heat-fusible organic filler | 50 | 50 | 50 | 50 |
| Inorganic filler | | | | |
| Silicic acid (43–104 μm) | 100 | 200 | 100 | 200 |
| Anhydrous calcium carbonate powder | 100 | 100 | 100 | 100 |
| Rust-preventive pigment | | | | |
| Barium metaborate | 10 | 10 | 10 | 10 |
| Calcium hydroxide | 10 | 10 | 10 | 10 |
| Red iron oxide | 10 | 10 | 10 | 10 |
| Dispersing agent (solids content 25%) | 2 | 2 | 2 | 2 |
| Hydroxyethylcellulose (4% aqueous solution) | 25 | 25 | 25 | 25 |
| Water | 58 | 100 | 58 | 100 |
| Total | 525 | 667 | 465 | 607 |
| Coat film formation | | | | |
| Film thickness (μm) | 200–250 | 250–300 | 200–250 | 250–300 |
| Uniformity of coat film | Good | Good | Good | Good |
| Rust prevention | Good | Good | Good | Fair |
| Adherence to cement mortar | Good | Good | Locally peeling at coat film/interface | Locally peeling at coat film/interface |

The results shown in Table 8 indicate that the rust-preventive compositions containing the bitumen emulsion (coal tar emulsion) are advantageous also from the economical viewpoint since an increase in the amount of inorganic filler do not lead to decreases in physical characteristics of coat films or in rust-preventive characteristics.

What is claimed is:

1. A process for preventing rust formation on metal substrates, which comprises the steps of:
   (a) coating the metal substrate with an aqueous polymer emulsion containing (i) a film forming polymer comprising at least one compound selected from the group consisting of carboxylated styrene-butadiene rubbers, carboxyl group containing acrylic copolymer, carboxyl group containing styrene-acrylic copolymers, glycidyl group containing acrylic copolymers, and glycidyl group containing styrene-acrylic copolymers, (ii) a heat fusible organic filler, and (iii) a bitumen emulsion in an amount of 5–100 parts by weight per 100 parts of the polymer solids in the aqueous polymer emulsion;
   (b) predrying the coated substrate at a temperature at which the film-forming polymer will form a film but at which the heat fusible organic filler does not melt or soften; and
   (c) baking the predried, film-coated substrate at a temperature at which the heat fusible organic filler melts or softens, the heat fusible organic filler having a melting or softening point within the range of 40° to 250° C., which temperature is higher by at least 50° C. than the film forming temperature of the film forming polymer present in the aqueous polymer emulsion.

2. The process of claim 1, wherein the aqueous polymer emulsion further contains a bitumen emulsion.

3. The process of claim 1 or 2, wherein the polymer has a film-forming temperature of not higher than 50° C.

4. The process of claim 1 or 2, wherein the heat-fusible organic filler is incorporated in an amount of 3 to 500 parts by weight per 100 parts by weight of the polymer solids in the aqueous polymer emulsion.

5. The process of claim 1, wherein the heat-fusible organic filler is at least in part a granular material having a grain size of 10–200 m or a short fiber-like material having a fiber length of 0.1 to 10 mm and is incorporated in a total amount of 10 to 400 parts by weight per 100 parts by weight of the polymer solids in the aqueous polymer emulsion.

6. The process of claim 1 or 2, wherein the heat-fusible organic filler has a crosslinking group within the molecule thereof.

7. The process of claim 5, wherein the crosslinking group is a carboxyl, glycidyl, or methylol group.

8. The process of claim 6, wherein the heat-fusible organic filler having a crosslinking group within the molecule thereof is at least one compound selected from the group consisting of an uncured epoxy resin, a phenol resin precondensate, and alkylphenol resin precondensate.

9. The process of claim 1 or 2, wherein the film-forming crystalline polymer has a crosslinking group within the molecule thereof.

10. The process of claim 8, wherein the crosslinking group is a carboxyl, glycidyl, or methylol group.

11. The process of claim 1, wherein the bitumen emulsion comprises at least one emulsion selected from the group consisting of an asphalt emulsion, a tar emulsion, and a tar pitch emulsion.

12. The process of claim 1 or 2, wherein the aqueous polymer emulsion further contains an inorganic filler.

13. The process of claim 12, wherein the inorganic filler is incorporated in an amount of 40 to 800 parts by weight per 100 parts by weight of the polymer solids in the aqueous polymer emulsion.

14. The process of claim 13, wherein the inorganic filler is at least in part a granular material having a grain size of 10 to 200 m or a short fiber-like material having a fiber length of 0.1 to 10 mm and is incorporated in a total amount of 10 to 400 parts by weight per 100 parts by weight of the polymer solids in the aqueous emulsion.

15. The process of claim 1 or 2, wherein the aqueous polymer emulsion further contains a rust preventive pigment.

16. The process of claim 15, wherein the rust preventive pigment is incorporated in an amount of 10 to 200 parts by weight per 100 parts by weight of the polymer solids in the aqueous polymer emulsion.

* * * * *